(12) United States Patent
Chen et al.

(10) Patent No.: US 9,053,408 B2
(45) Date of Patent: Jun. 9, 2015

(54) MULTI-CORE PROCESSOR BASED HIGH-SPEED DIGITAL TEXTILE PRINTING PROCESSING SYSTEM AND METHOD

(71) Applicant: ZHEJIANG UNIVERSITY, Hangzhou, Zhejiang Province (CN)

(72) Inventors: Yaowu Chen, Hangzhou (CN); Rongxin Jiang, Hangzhou (CN); Pengjun Wang, Hangzhou (CN); Fan Zhou, Hangzhou (CN)

(73) Assignee: ZHEJIANG UNIVERSITY, Hangzhou, Zhejiang Province (CN)

( * ) Notice: Subject to any disclaimer, the term of this patent is extended or adjusted under 35 U.S.C. 154(b) by 0 days.

(21) Appl. No.: 14/369,816

(22) PCT Filed: Dec. 25, 2012

(86) PCT No.: PCT/CN2012/087381
§ 371 (c)(1),
(2) Date: Jun. 30, 2014

(87) PCT Pub. No.: WO2013/097691
PCT Pub. Date: Jul. 4, 2013

(65) Prior Publication Data
US 2014/0355064 A1 Dec. 4, 2014

(30) Foreign Application Priority Data

Dec. 30, 2011 (CN) .......................... 2011 1 0454966

(51) Int. Cl.
*G06K 15/02* (2006.01)
*G06F 3/12* (2006.01)

(52) U.S. Cl.
CPC .......... *G06K 15/1809* (2013.01); *G06F 3/1206* (2013.01); *G06F 3/1215* (2013.01); *G06F 3/1247* (2013.01); *G06F 3/1289* (2013.01); *G06F 3/122* (2013.01); *G06F 3/1279* (2013.01); *G06K 15/1817* (2013.01); *G06K 15/1894* (2013.01)

(58) Field of Classification Search
USPC ......................................... 358/1.15
See application file for complete search history.

(56) References Cited

U.S. PATENT DOCUMENTS

| 8,924,688 | B2* | 12/2014 | Sharma | 712/38 |
| 2006/0268316 | A1 | 11/2006 | Condon et al. | |
| 2008/0174814 | A1* | 7/2008 | Nagata | 358/1.15 |
| 2008/0244150 | A1* | 10/2008 | Sharma | 710/316 |
| 2012/0206754 | A1* | 8/2012 | Aota | 358/1.14 |

FOREIGN PATENT DOCUMENTS

| CN | 101398804 A | 4/2009 |
| CN | 101786384 A | 7/2010 |
| CN | 102591602 A | 7/2012 |

* cited by examiner

*Primary Examiner* — Qian Yang
(74) *Attorney, Agent, or Firm* — Jacobson Holman PLLC; Jiwen Chen

(57) ABSTRACT

The present invention discloses a multi-core processor based high-speed digital textile printing processing system, comprising a gigabit Ethernet interface, a I2C interface, a Stream IO interface and a multi-core processor; the multi-core processor comprises a command receiving unit, a command processing unit, a command output unit, a data receiving unit, a compressed data buffer unit, a data decompression unit, a decompressed data buffer unit and a data output unit; meanwhile, the present invention also disclosed a multi-core processor based high-speed digital textile printing processing method. The present invention is centered on high-performance multi-core processor, which aims to implement high-speed transmission of printing data from PC to printing nozzle via the gigabit Ethernet and Stream IO interface as well as processing and transfer of printing commands via the gigabit Ethernet and I2C interface. Meanwhile, it is also capable of executing such processing as decompression of printing images and image rotation, which has significantly improved the work efficiency of digital textile printing system.

6 Claims, 4 Drawing Sheets

MULTI-CORE PROCESSOR BASED HIGH-SPEED DIGITAL TEXTILE PRINTING PROCESSING SYSTEM AND METHOD

This is a U.S. national stage application of PCT Application No. PCT/CN2012/087381 under 35 U.S.C. 371, filed Dec. 25, 2012 in Chinese, claiming the priority benefit of Chinese Application No. 201110454966.9, filed Dec. 30, 2011, which is hereby incorporated by reference.

FIELD OF THE INVENTION

The present invention is related to the technical field of textile printing, in particular, to a multi-core processor based high-speed digital textile printing processing system and a method thereof.

BACKGROUND ART

Accompanied by higher and higher requirements for printing precision, flexibility of batched production and environmental protection in textile printing industry, digital textile printing technology is gradually replacing conventional printing technologies to become the dominant technology in the textile printing industry. Increasing market demands for digital textile printing and rapid development of digital textile printing industry have put forward higher and higher requirements for the digital textile printing speed. Under such circumstances, a processing system with quicker data processing capacity is required to implement the data transmission and processing by the digital textile printing machine.

Most of existing digital textile printers make use of PC (personal computer) to complete processing of printing image before sending the processed printing data and printing control commands to the digital textile printing nozzle via the parallel interface. As limited by the common processor of PC and low transmission speed of the parallel interface, most of existing digital textile printers cannot conduct real-time processing of printing images of large data quantity. Furthermore, their printing speed also lags far behind of textile printers using conventional printing technologies, which is unlikely to bring advantages such as high precision and minimized pollution. Moreover, such digital printing machines cannot be extensively applied to practical production.

Currently, single-core processors are confronted with the unbridgeable gap of power consumption and other problems in terms of mere increase of dominant frequency. Multi-core processors will become a mainstream in the field of PC and embedded system in the future. The multi-core processor as manufactured by Tilera is based on the so called "mesh network" communication mechanism other than conventional bus based communication modes. It is a two-dimensional (2D) communication mode that can significantly reduce the power consumption, and improve communication efficiency among different cores. Power consumption of GX series 16-core CPU as manufactured by Tilera has been reduced to 22 W with memory bandwidth and dominant frequency up to 205 Gpbs and 1.25 GHz, respectively. Furthermore, this multi-core processor is provided with abundant network interfaces and high-speed transmission interfaces, such as PCI-EXPRESS interface, I2C interface, and Stream IO interface and so on. Transmission speed of Stream IO interface is up to 20 Gpbs, which can fully satisfy the demand of modern processing systems for data transmission in large quantity.

SUMMARY OF THE INVENTION

In view of aforesaid technical drawbacks of prior arts, the present invention aims to provide a multi-core processor based high-speed digital textile printing processing system and method for high-speed processing and transmission of printing data.

TECHNICAL SOLUTION

A multi-core processor based high-speed digital textile printing processing system, comprising a gigabit Ethernet interface, an I2C interface, a Stream IO interface and a multi-core processor, wherein:

The multi-core processor receives printing commands and data from external equipments via the gigabit Ethernet interface, and proceeds with analysis of the printing commands before sending printing control commands to external equipments via I2C interface; meanwhile, it also proceeds with decompression and rotation of the printing data, and sends the decompressed and rotated data to external equipments via the Stream IO interface;

The multi-core processor comprises:

a command receiving unit used to receive printing commands from external equipments via the gigabit Ethernet interface for analysis and output of printing operation and control command;

a command processing unit used to process the printing operation commands, and output operation instructions;

a command output unit used to transfer the printing control commands to external equipments via the I2C interface;

a data receiving unit used to receive printing data from external equipments via the gigabit Ethernet interface according to the operation instructions;

a compressed data buffer unit used to buffer printing data as received by the data receiving unit;

a data decompression unit used to extract printing data from compressed data buffer unit and decompress the extracted printing data;

a decompressed data buffer unit used to buffer printing data as decompressed by the data decompression unit;

a data output unit used to, according to the operation instructions, extract decompressed printing data from the decompressed data buffer unit, rotate the decompressed printing data, and further send the decompressed and rotated printing data to external equipments via the Stream IO interface.

In a preferred embodiment, the multi-core processor is provided with at least four cores. The command receiving unit and data receiving unit belong to the first core of the multi-core processor; the first core serves as the main core of the multi-core processor. The data decompression unit belongs to the second core and the data output unit belongs to the third core of the multi-core processor, respectively. The command processing unit and command output unit belong to the fourth core of the multi-core processor. The multi-core processor fully takes advantages of multi-core processing to improve the efficiency of digital printing processing.

In another preferred embodiment, the gigabit Ethernet interface is a gigabit Ethernet optical fiber interface featuring in high transmission speed.

In a further preferred embodiment, the compressed data buffer unit or decompressed data buffer unit serves as an expanded DDR3 memory chip of the multi-core processor, featuring in high reading and writing speed.

A multi-core processor based high-speed digital printing processing method, comprises the following steps:

(1) The printing command is received and stored into the command buffer area by the command receiving unit in the first core via the gigabit Ethernet interface; whereas an interrupt?? signal is sent from mailbox to the fourth core; the command processing unit of the fourth core, upon receiving the interrupt?? signal, extracts corresponding printing commands from the command buffer area for processing, and outputs operation instructions to the first core and 3; whereas the command output unit of the fourth core, upon receiving the interruption signal, extracts corresponding printing commands from the command buffer area for transfer via the I2C interface.

(2) The printing data is received and stored into the compressed data buffer unit by the data receiving unit in the first core via the gigabit Ethernet interface according to operation instructions; whereas an interruption signal is sent from mailbox to the second core; the data decompression unit in the second core extracts the printing data from the data buffer unit and decompresses the extracted data upon reception of the interruption signal;

(3) The data decompression unit in the second core stores decompressed printing data into the decompressed data buffer unit upon completion of data decompression, and sends an interruption signal to the third core via the mailbox; the data output unit in the third core extracts the decompressed printing data from the decompressed data buffer unit and rotates the decompressed printing data according to operation instructions upon receipt of the interruption signal, and outputs the printing data as decompressed and rotated via the Stream IO interface.

The present invention is centered on a high-performance multi-core processor, which aims to implement high-speed transmission of printing data from PC to printing nozzles via the gigabit Ethernet and Stream IO interface as well as processing and transfer of printing commands via the gigabit Ethernet and I2C interface. Meanwhile, it is also capable of executing such processing as decompression of printing images and image rotation, which has significantly improved the work efficiency of digital printing systems.

According to the present invention, the compressed data buffer unit and decompressed data buffer unit are set up during data transmission to implement parallel operation of the data receiving unit, data decompression unit and data output unit, which can minimize the delay of data transmission, and improve data throughput of the system. Meanwhile, the present invention makes use of gigabit Ethernet interface for connection with PC to implement seamless connection of digital textile printer and network equipments, and improvement of expansibility of the digital textile printer. The shared memory and mailbox technique are used to implement data sharing and synchronization among cores, which can improve the work efficiency of the digital textile printing system. Therefore, the present invention can implement the data transmission at a speed over 100 MB/s; the present invention can bring into play advantages of digital printing, such as high precision and flexibility as well as minimized pollution while ensuring high-speed printing, which can be extensively applied to practical production.

PREFERRED EMBODIMENTS OF THE INVENTION

To ensure more specific description of the present invention, technical specification and methods of the present invention are described hereinafter in details in combination with drawings and preferred embodiments.

Figure 1:
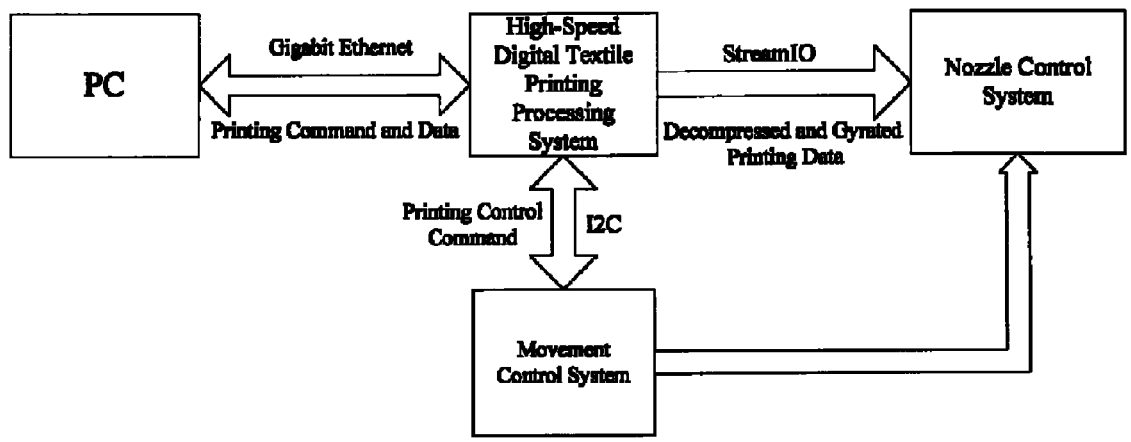
FIG. 1 is the schematic diagram for high-speed digital printing.

The high-speed digital textile printing principle as shown in FIG. 1 is stated as follows: First, data on printing images and printing commands from PC are received via the gigabit Ethernet. Then, the printing commands are analyzed and processed before being sent to the movement control system, which decompresses and rotates printing data before sends the printing data to the nozzle control system. Finally, the images for printing are printed on the carrier by the nozzles of printing machines according to printing control commands.

Figure 2:
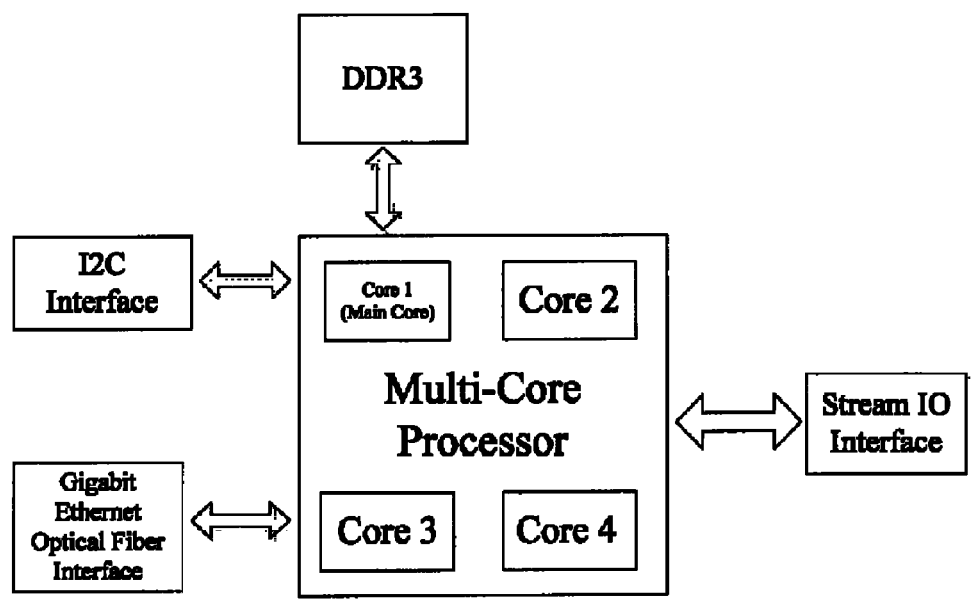
FIG. 2 is the structural diagram for hardware of the present invention.
Figure 3:
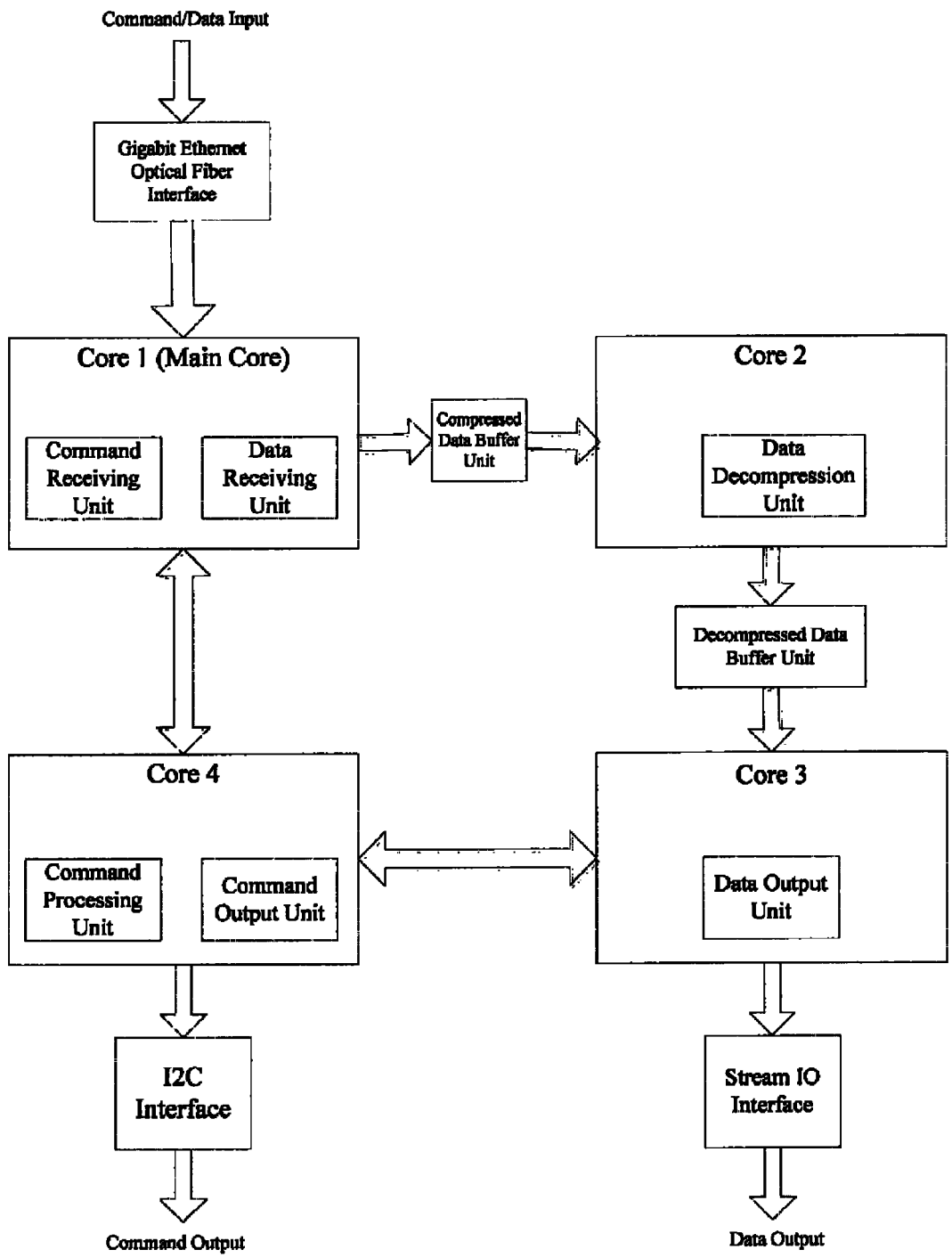
FIG. 3 is the schematic diagram for the system structure of the present invention.

A multi-core processor based high-speed digital textile printing processing system as shown in FIGS. 2 and 3, comprises a gigabit Ethernet optical fiber interface, an I2C interface, a Stream IO interface and a multi-core processor, wherein:

the multi-core processor comprises:

a command receiving unit used to receive printing commands from PC via the gigabit Ethernet optical fiber interface for analysis and output of printing operation and control commands;

a command processing unit used to process the printing operation commands, and output operation instructions;

a command output unit used to transfer the printing control commands to external equipments via the I2C interface;

a data receiving unit used to receive printing data from PC via the gigabit Ethernet optical fiber interface according to the operation instructions;

a compressed data buffer unit used to buffer printing data as received by the data receiving unit;

a data decompression unit used to extract printing data from compressed data buffer unit and decompress the printing data;

a decompressed data buffer unit used to buffer printing data as decompressed by the data decompression unit;

a data output unit used to extract decompressed printing data from the decompressed data buffer unit for rotation according to the operation instructions, and further send the printing data as decompressed and rotated to the nozzle control system via the Stream IO interface.

Wherein, the command receiving unit and data receiving unit belong to the first core of the multi-core processor; the first core serves as the main core of the multi-core processor; data decompression unit belongs to the second core of the multi-core processor and data output unit belongs to the third core of the multi-core processor, respectively; whereas the command processing and output units belong to the fourth core of the multi-core processor; both compressed data buffer unit and decompressed data buffer unit belong to expanded DDR3 memory chip of the multi-core processor.

The multi-core processor in this embodiment is TileGx multi-core processor (Tile-Gx16) as manufactured by Tilera; the processor has 16 cores with dominant frequency up to 1.2 GHz; whereas dominant frequency of expanded DDR3 of the multi-core processor is up to 1, 333 MHz.

The multi-core processor based high-speed digital printing and processing method in this embodiment, comprises the following steps:

(1) The printing commands from PC is received and stored into the command buffer area by the command receiving unit in the first core via the gigabit Ethernet optical fiber interface; whereas an interruption signal is sent from mailbox to the fourth core; the command processing unit of the fourth core, upon receiving interruption signal, extracts corresponding printing commands from the command buffer area for processing, and outputs operation instructions to the first core and the third core; whereas the command output unit of the fourth core extracts corresponding printing commands from the command buffer area for transfer to the movement control system via the I2C upon receiving the interrupt signal.

(2) The printing data is received by and stored into the compressed data buffer unit by the data receiving unit in the first core via the gigabit Ethernet optical fiber interface according to operation instructions; whereas an interrupt signal is sent from mailbox to the second core; the data decompression unit in the second core extracts the printing data from the data buffer unit for decompression upon receiving the interrupt signal;

(3) The data decompression unit in the second core stores decompressed printing data into the decompressed data buffer unit upon completion of data decompression, and sends an interruption signal to the third core via the mailbox; the data output unit in the third core extracts the decompressed printing data from the decompressed data buffer unit for rotation according to operation instructions upon receiving the interrupt signal, and sends the printing data as decompressed and rotated to the nozzle control system via the Stream IO interface.

Figure 4:
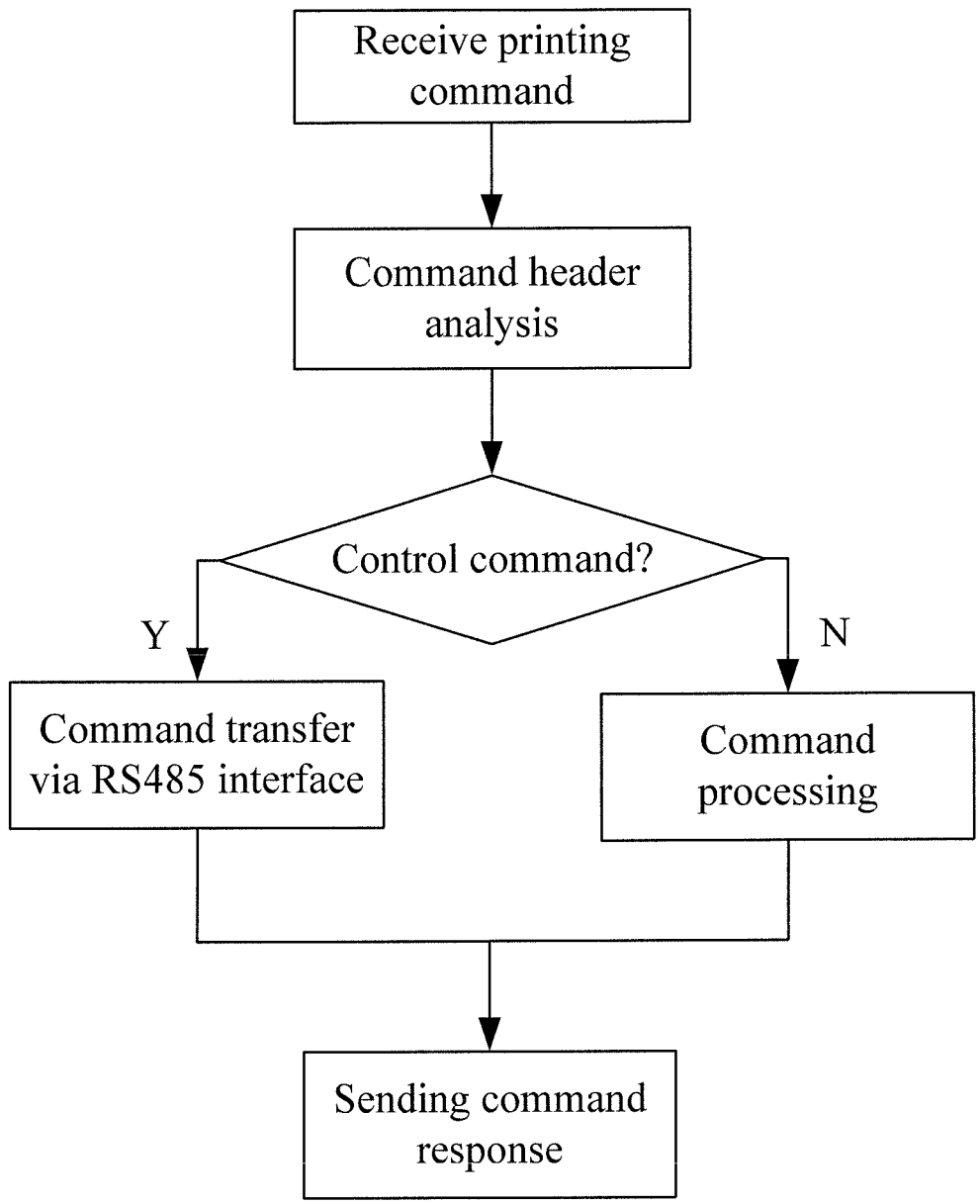
FIG. 4 is the flow chart for system command processing of the present invention.

As shown in FIG. 4, printing command processing flow in this embodiment is stated as follows:

A. The command receiving unit is used to receive the printing commands from printing control terminal (PC) via the gigabit Ethernet optical fiber interface and analyze the command headers; the commands are differentiated according to their types; the operation commands to be processed by this system are transferred to the command processing unit for processing; whereas the control commands to be transferred are sent to the command output unit for transfer.

B. The command processing unit is used for analysis and processing of operation commands as well as alteration of system working status (control the receiving and sending operations of the data receiving and output units); once the command processing is completed, corresponding results are fed back to PC via the gigabit Ethernet optical fiber interface.

C. The command transfer unit is used to receive the control commands to be transferred from the command receiving unit for transfer to the movement control system via the I2C interface; once the commands are transferred, corresponding results are received via the I2C interface before being fed back to the main control PC via the gigabit Ethernet optical fiber interface.

Figure 5:
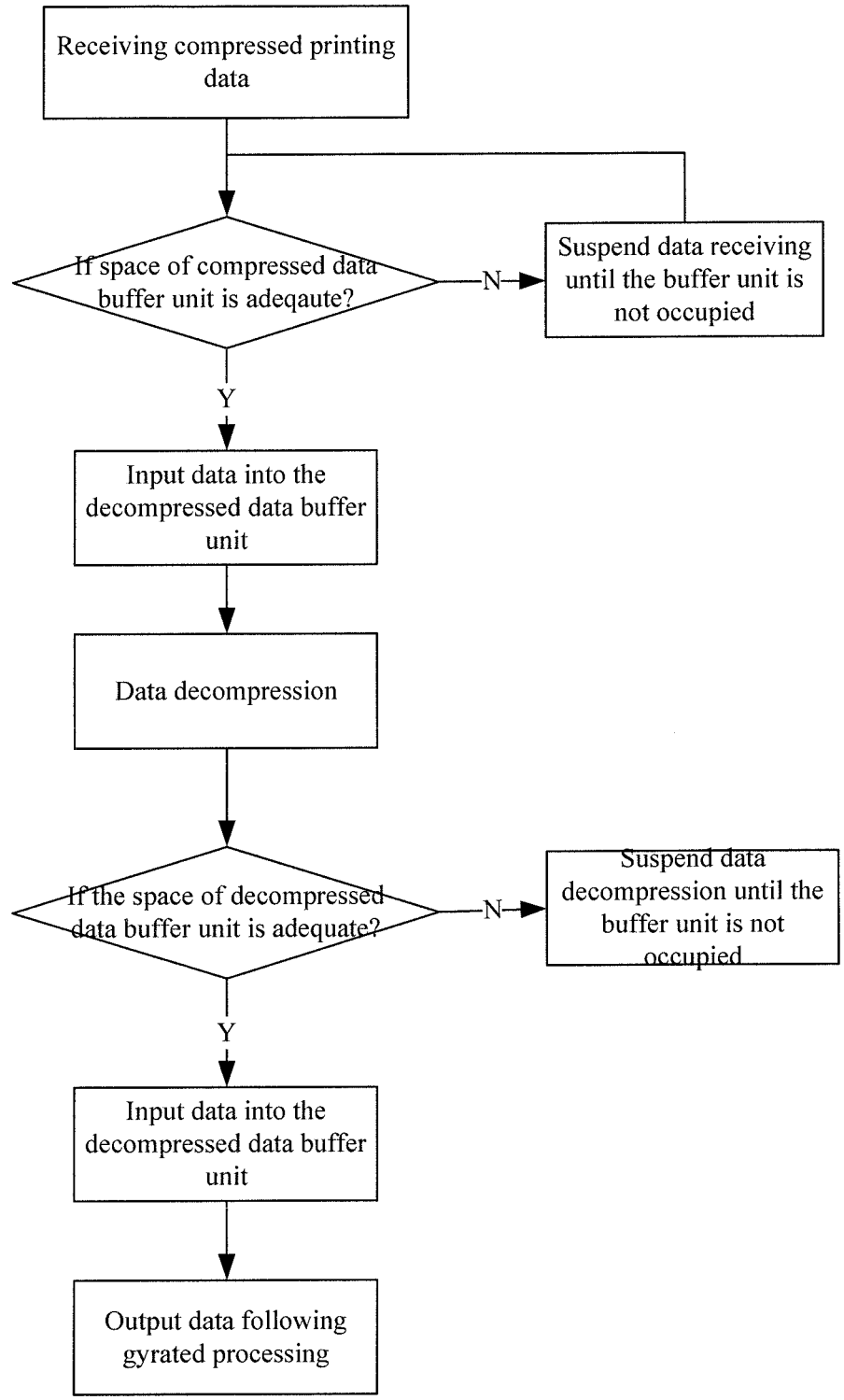
FIG. 5 is the flow chart for system data processing of the present invention.

As shown in FIG. 5, printing data processing flow in this embodiment is stated as follows:

A. The data receiving unit receives the printing data as compressed with RLE compression algorithm from the printing control terminal (PC) via the gigabit Ethernet optical fiber interface, and check current system working status; if the system is at printing status, and the compressed data buffer unit (DDR3) has adequate free space, the received data is stored in the compressed data buffer unit; otherwise, the compressed data buffer is emptied to stop receiving of the printing data.

B. The data decompression unit extracts printing data to be processed from the compressed data buffer unit for decompression in pieces with RLE decompression algorithm; if the compressed data buffer unit (DDR3) has adequate spare volume, the decompressed data is stored in the decompressed data buffer unit; otherwise, extraction of printing data from the compressed data buffer unit and decompression are suspended.

C. The data output unit extracts decompressed data from the compressed data buffer unit, and checks the system working status; if the system is at printing status, the decompressed data is transmitted to the printing nozzle via the Stream IO interface following rotation; otherwise, data output is suspended, and the decompressed data buffer unit is emptied.

As verified, in the event that the high-speed digital printing processing system of prior arts is used for processing and transmission of image data, the printing speed at the printing precision of 600*600 dpi is 20 $m^2$/h; the printing speed and data throughput is up to 120 $m^2$/h and 100 MB/s, respectively, if this embodiment is used for processing and transmission at the same printing precision. As manifested by data comparison, this embodiment can significantly improve the data transmission efficiency and throughput, and implement high-effect yield of digital textile printer.

The invention claimed is:

1. A multi-core processor based high-speed digital textile printing processing system, comprising a gigabit Ethernet interface, an I2C interface, a Stream IO interface and a multi-core processor, wherein:

the multi-core processor receives printing commands and printing data from a first external equipment via the gigabit Ethernet interface, and proceeds with analysis of the printing commands before sends printing control commands to a second external equipment via I2C interface; meanwhile, the multi-core processor proceeds with decompressing and rotating the printing data and sends the decompressed and rotated printing data to a third external equipment via the Stream IO interface;

the multi-core processor further comprises:

a command receiving unit used to receive the printing commands from the first external equipment via the gigabit Ethernet interface, analyze the received printing commands, and output printing operation commands and the printing control commands;

a command processing unit used to process the printing operation commands, and output operation instructions;

a command output unit used to transfer the printing control commands to the second external equipment via the I2C interface;

a data receiving unit used to receive the printing data from the first external equipment via the gigabit Ethernet interface according to the operation instructions;

a compressed data buffer unit used to buffer the printing data as received by the data receiving unit;

a data decompression unit used to extract the printing data from compressed data buffer unit and decompress the extracted printing data;

a decompressed data buffer unit used to buffer the printing data as decompressed by the data decompression unit;

a data output unit used to extract decompressed printing data from the decompressed data buffer unit for rotation according to the operation instructions, and further send the printing data as decompressed and rotated to the third external equipment via the Stream IO interface;

the multi-core processor is provided with at least four cores; the command receiving unit and data receiving unit belong to a first core of the multi-core processor; the first core serves as the main core of the multi-core processor; the data decompression unit belongs to a second core of the multi-core processor and the data output unit belongs to a third core of the multi-core processor, respectively; whereas the command processing unit and command output unit belong to a fourth core of the multi-core processor;

wherein a mailbox is used to send an interrupt signal to the second core, the third core and the fourth core of the multi-core processor, respectively;

wherein the command processing unit of the fourth core extracts the corresponding printing commands from a command buffer area for processing upon receipt of the interruption signal, and outputs the operation instructions to the first core of the multi-core processor and the third core of the multi-core processor;

wherein the data decompression unit in the second core of the multi-core processor extracts the printing data from the compressed data buffer unit for decompression upon receiving the interrupt signal;

wherein the data output unit in the third core of the multi-core processor extracts the decompressed printing data from the decompressed data buffer unit for rotation according to operation instructions upon receiving the interrupt signal, and outputs the printing data as decompressed and rotated via the Stream IO interface.

2. The multi-core processor based high-speed digital textile printing processing system according to claim 1, characterized in that the gigabit Ethernet interface is a gigabit Ethernet optical fiber interface.

3. The multi-core processor based high-speed digital textile printing processing system according to claim 1, characterized in that the compressed data buffer unit or decompressed data buffer unit serves as the expanded DDR3 memory chip of the multi-core processor.

4. A multi-core processor based high-speed digital textile printing processing method, comprising the following steps:
(1) printing commands are received and stored into a command buffer area by a command receiving unit in a first core of the multi-core processor via a gigabit Ethernet optical fiber interface; whereas an interrupt signal is sent from a mailbox to a fourth core of the multi-core processor; a command processing unit of the fourth core extracts corresponding printing commands from the command buffer area for processing upon receipt of an interruption signal, and outputs operation instructions to the first core of the multi-core processor and a third core of the multi-core processor; whereas a command output unit of the fourth core of the multi-core processor extracts corresponding printing commands from the command buffer area for transfer via the I2C upon receiving the interruption signal;
(2) printing data is received and stored into a compressed data buffer unit by a data receiving unit in the first core of the multi-core processor via the gigabit Ethernet interface according to the operation instructions; whereas an interrupt signal is sent from the mailbox to a second core of the multi-core processor; a data decompression unit in the second core of the multi-core processor extracts the printing data from the compressed data buffer unit for decompression upon receiving the interrupt signal;
(3) the data decompression unit in the second core of the multi-core processor stores decompressed printing data into a decompressed data buffer unit upon completion of data decompression, and an interruption signal is sent from the mailbox to the third core of the multi-core processor; a data output unit in the third core of the multi-core processor extracts the decompressed printing data from the decompressed data buffer unit for rotation according to the operation instructions upon receiving the interrupt signal, and outputs the printing data as decompressed and rotated via the Stream IO interface.

5. The multi-core processor based high-speed digital textile printing processing method according to claim 4, characterized in that the gigabit Ethernet interface is a gigabit Ethernet optical fiber interface.

6. The multi-core processor based high-speed digital textile printing processing method according to claim 4, characterized in that the compressed data buffer unit or decompressed data buffer unit serves as the expanded DDR3 memory chip of the multi-core processor.

* * * * *